Nov. 14, 1950     E. A. PRICE     2,530,361
LIGHT BAFFLE AND SUPPORT THEREFOR
Filed Feb. 3, 1948
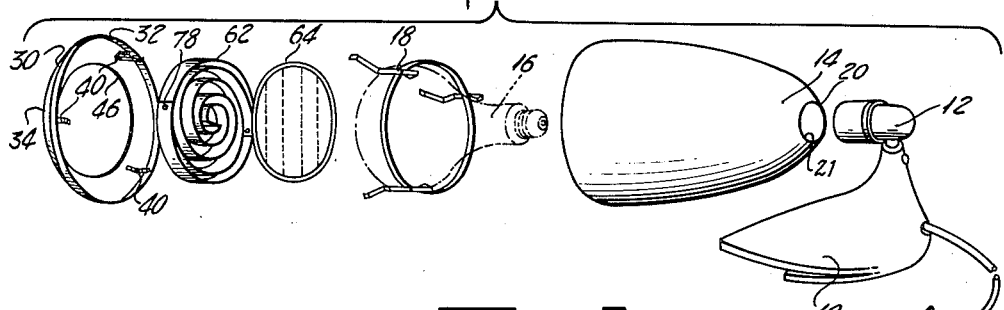
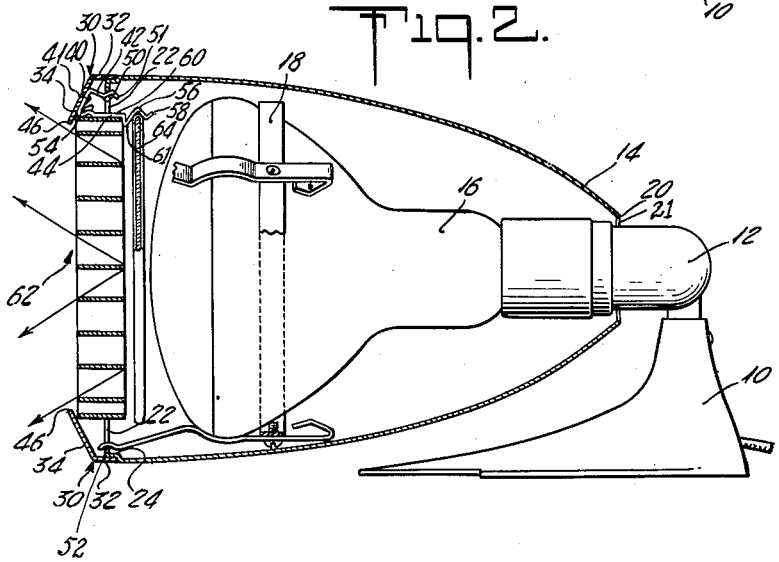
INVENTOR.
EDISON A. PRICE
BY Schaines & Lieberman
ATTORNEYS Patented Nov. 14, 1950

2,530,361

UNITED STATES PATENT OFFICE 2,530,361

LIGHT BAFFLE AND SUPPORT THEREFOR

Edison A. Price, New York, N. Y., assignor to Display Lighting Incorporated, New York, N. Y., a corporation of New York Application February 3, 1948, Serial No. 6,112

7 Claims. (Cl. 240—46.41)

1

The present invention relates generally to lighting fixtures, and in particular it relates to such fixtures used mainly for display and theatrical purposes, in which connections it is desired to direct the light rays to a particular spot or area. In such uses, it is desired to impart different colors to the light rays, and the present invention makes suitable provision for this purpose as well.

The main object of the present invention is the provision of a light baffle or louvre which comprises a strip or band of material disposed in the shape of a helix, the convolutions of which are unsupported except at the periphery of the helix.

Another object of the present invention is the provision of a light baffle or louvre which consists of an elongated strip or band of material bent medially on itself, the ends of which strip or band are coiled about the central portion into helical form, the terminals of the strip ends being disposed at the periphery of the helix and at opposite sides thereof, the convolutions being otherwise unsupported.

An associated main object of the present invention is the provision of a cap attachment to light housings which is provided with means to quickly and releasably mount therewithin not only a light baffle but also a light filter, the filter being mountable either behind the baffle, rearwardly of the mouth of the housing, or immediately adjacent the housing mouth when no baffle is employed.

Still another object of the present invention is the provision of a cap for a light housing which has rearwardly extending spring clip means to releasably engage the mouth of the housing, and rearwardly extending spring clip means to receive and support a light baffle or a light filter or both.

Other, further, and more specific objects of the present invention will in part be obvious and in part pointed out specifically in connection with the following description of an illustrative embodiment.

In the drawng annexed hereto, forming a part hereof,

Figure 1 is an exploded view of an assembly of base, socket, housing, bulb, housing support, filter, light baffle and cap, the parts being shown in perspective, the cap and baffle being constructed according to and embodying the present invention;

Figure 2 is a vertical section through a light housing with the above parts mounted therewithin, showing the cap, louvre, filter and attaching means, partly in section and partly in elevation; and Figure 3 is a front elevational view looking towards the mouth of the assembly of Fig. 1, illustrating the construction of the light baffle or louvre.

The cap and light director or baffle of my invention are well adapted for use with bullet shaped housings, and will be described and illustrated herein so used. It is to be understood, however, that the cap and baffle may be used in other installations, and that my invention is to be limited only by the scope of the annexed claims. For convenience, the light baffle will hereinafter be referred to as a louvre.

Referring to the drawings, the assembly shown includes a heavy base 10, a swivel socket 12 mounted thereon, a bullet housing 14, and a reflector bulb 16, and a housing support mechanism 18 thereon. The support 18 is the only element of these which is not conventional, and is the subject of a separate application for patent filed simultaneously herewith, Serial No. 6111. It is to be noted further that the housing 14 is of conventional bullet shape; that is, relatively elongated, tapered downwardly towards the rear 20, circular in section, and having a large circular front opening 22. With my invention, I am enabled to provide an aperture as 21, at the rear of the housing. The rim edge of front opening 22 may be bent downwardly, forwardly and inwardly as at 24 (Fig. 2) to provide a stepped formation, although this is not absolutely essential. As described and claimed in my copending application, Serial No. 6111, housing 14 may be supported on and about bulb 16 by means of ring device 18. As will be readily understood, the assembly of base, bulb, housing and housing support is all that is needed for ordinary lighting purposes. However, when it is desired to more specifically locate and direct the light rays, as onto one particular spot or area, a light directing means must be provided together with means to mount same on the housing. Also, since it is often desired to color the rays, a suitably colored filter must be provided, together with means to mount same as desired either near the mouth of the housing, or behind the light rays director.

Cap 30 consists of an annular stamping of suitable light gauge metallic material, having a collar 32 at the rear thereof, and a short forwardly and inwardly sloping shield portion 34 at the front. Collar 32 is so dimensioned as to fit over the front of the housing 14 and may, if desired, be ordinarily friction fitted thereon. It is much more desirable, however, to provide more positive means for the ready attachment of cap 30 to the housing. A plurality of spring clips 40, 40, are provided and secured inside cap 30, on the inner aspect of slope 34 as by screws or rivets 41, 41. Three clips 40, 40 are shown, but more may be provided if desired. Each clip 40 comprises a strip of spring metal material, bent into a U-shape, the legs being substantially, though not necessarily parallel and the clip being so mounted as to keep the legs in radial alignment with respect to the center of the cap, with the shorter leg 42 near collar 32, and the longer leg 44 adjacent the inner edge 46 of slope 34 (see Fig. 2). Outermost and shorter legs 42 are crimped or bent as at 50 to form seats or recesses, into which the edge 52 of the housing opening fits, legs 42 being normally biased outwardly so as to grip and hold cap 30 on housing 14. The terminals of legs 42, 42 are reversely bent, as at 51, to aid in fitting cap 30 onto housing 14. The inner and longer legs 44 are normally biased inwardly towards the center of cap 30, and are each provided with a seat or recess 54 near the base thereof opening toward the center, and a second seat or recess 56 near the free end 58 thereof, also opening toward the center of the cap, with a straight portion 60 between the seats or recesses 54, 56 (see Fig. 2). As best seen in this figure, leg 42 angles inwardly sharply, as at 61, adjacent seat 56, to provide a catch or guard for the light baffle.

When it is desired to use a louvre, as 62, which comprises a circular member, the structure of which will be detailed below, the louvre is simply snapped into position from the rear of cap 30 between inner spring fingers 44, 44, against the straight portions 60, 60, and held therebetween by their normal biasing, against the catch formed by angle 61, as seen in Fig. 2. It will be seen that fingers 44, 44 are of such length that the recessed portions 56 at the free ends 58, 58 thereof will extend rearwardly of louvre 62. Thus, when desired, a circular filter disc as 64 which is of slightly larger diameter than louvre 62 may be snapped into position in recesses or seats 56, 56 and held therein by the normal tendency of fingers 44, 44 to reach towards the center or hub of the cap. If it be desired to employ filter 64 without the louvre, the filter may be disposed within seats or recesses 54, 54 near and closely adjacent the mouth of cap 30, or within seats or recesses 56, 56 spaced substantially rearwardly of the mouth opening. If in the rearward position, there may be light leakage past the rim of the filter disc, which leakage is avoided when the filter is mounted in seats 54, 54. In either position, there is still left space between mouth 52 and the filter rim for ventilation.

Louvre 62, as will best be seen in Fig. 3, comprises a single, elongated strip or band of suitable light and heat resistant material, having a straight portion 70 at the center thereof. The two side portions 71, 73 of the blank are then coiled around center piece 70, on a constantly increasing radius of curvature, into the "helical" form seen in plan in Fig. 3, the terminal ends 74, 76 respectively being riveted or otherwise fastened as at 78 to the adjacent portion of the other side's outermost convolution to form a circle in plan, the interior defining a helix, or rather, a double helix of one elongated strip or band of material, the ends of the strip being disposed at the periphery of the helix. It is to be noted that the entire strip forming the louvre is thus supported at two points at the periphery of the louvre against sagging, and that the louvre in accordance with my invention requires no radially or diametrically extending supports as do prior constructions. The purpose and function of my louvre is generally obvious; that is, to limit or direct the movement of rays from bulb 16 in the direction parallel to the louvre's convolutions. Ordinary, single helices have been used as light ray directors or louvres, but in each instance, it has been necessary not only to support the center, but also to support the separate convolutions, as by means of a number of diametrically extended wires or rods. My double helix, and the two-point support provided by the ends at opposite sides of the device, obviate the necessity for central support or for supporting the separate convolutions.

Having now described my invention, what I claim and desire to secure by Letters Patent is:

1. A light baffle, circular in outline, comprising a relatively narrow, elongated strip, the ends of which, from adjacent the center thereof, are oppositely wound about one another in helical coils, the convolutions being self-supporting, with the midpoint of the strip being in the center of the baffle, and the terminal ends of the strip being disposed at the periphery of the baffle.

2. A light baffle as in claim 1, in which the successive convolutions of the strip are spaced from each other except at the periphery, where the terminal of each end portion is secured to the preceding convolution of the other end portion.

3. A light baffle, circular in outline, composed of an elongated, narrow strip of material extending from the periphery of the baffle at one side thereof in helical convolutions to the center of the baffle, and then, in oppositely wound helical convolutions, to the diametrically opposite side of the baffle.

4. A light baffle as in claim 3, in which the opposite ends of the strip are secured to the immediately adjacent convolutions at the periphery of the baffle, the center of the strip being thereby supported by the ends thereof.

5. A light louvre comprising an elongated strip bent transversely on itself adjacent the center thereof, the two end portions being disposed about the center portion in helical convolutions, the free ends being disposed on opposite sides of the baffle and each being secured to the preceding convolution to form a member of generally circular outline.

6. A circular outline light louvre comprising an elongated strip having a straight central portion and two end portions, the ends being wound about the central portions on circles of gradually increasing radius, the terminals of the end portions terminating on opposite sides of the louvre, the convolutions of the louvre being unsupported except by the ends thereof.

7. A circular outline light baffle comprising an elongated strip of material having a short straight central portion, and two elongated end portions, the ends being wound about the center in helical convolution to form a double helix, the convolutions being unsupported except at the periphery of the baffle.

EDISON A. PRICE.

REFERENCES CITED

The following references are of record in the file of this patent:

UNITED STATES PATENTS

| Number | Name | Date |
|---|---|---|
| 1,560,907 | Flautt | Nov. 10, 1925 |
| 2,298,556 | Foss | Oct. 13, 1942 |
| 2,430,472 | Levy | Nov. 11, 1947 |
| 2,437,522 | Handler | Mar. 9, 1948 |